June 29, 1965 W. R. RHINE 3,192,096
CONVEYING AND SEALING APPARATUS
Filed July 16, 1962 4 Sheets-Sheet 1

INVENTOR
WALLACE R. RHINE
BY Williamson & Palmatier
ATTORNEYS

June 29, 1965 W. R. RHINE 3,192,096
CONVEYING AND SEALING APPARATUS
Filed July 16, 1962 4 Sheets-Sheet 2
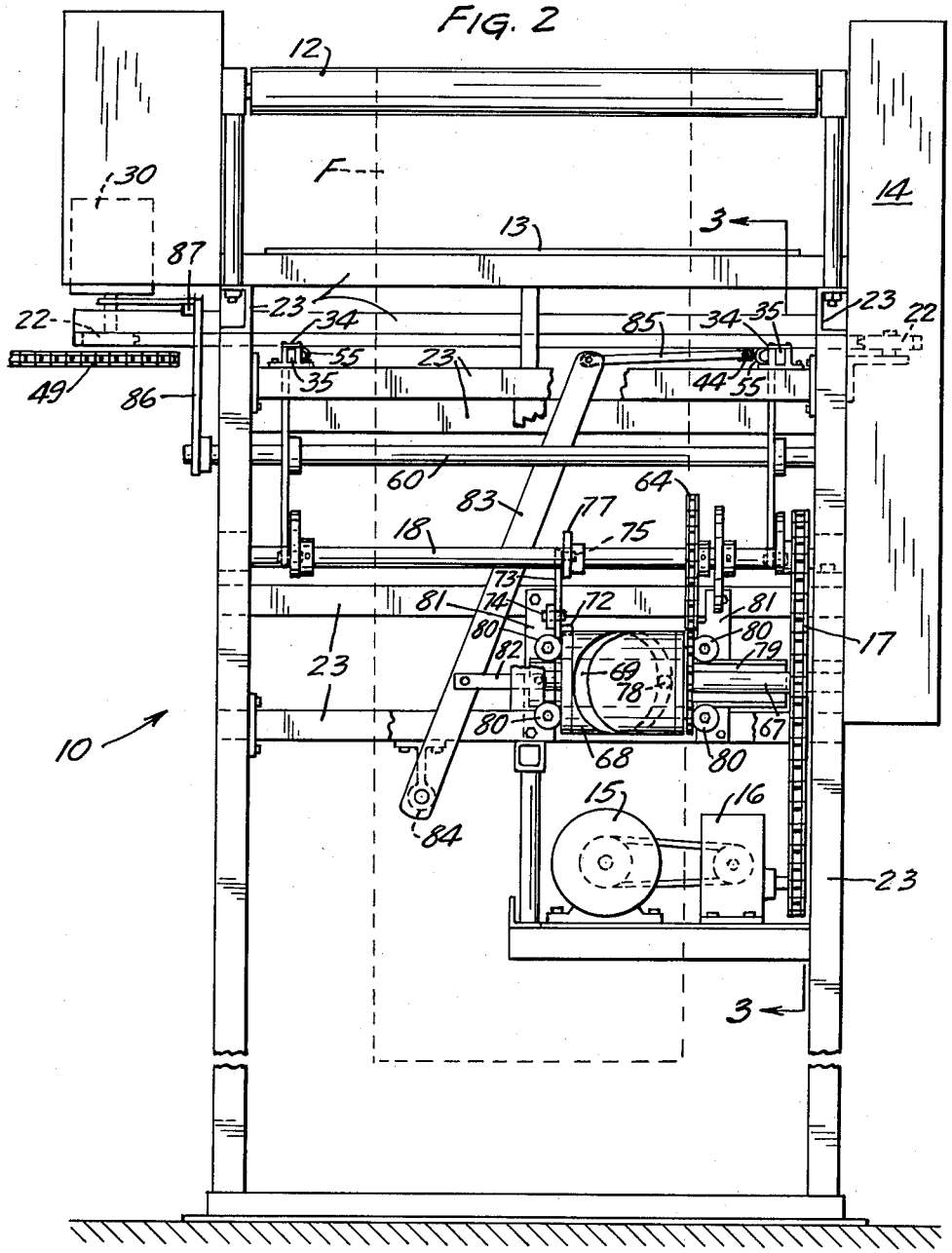
INVENTOR
WALLACE R. RHINE
BY Williamson & Palmatier
ATTORNEYS

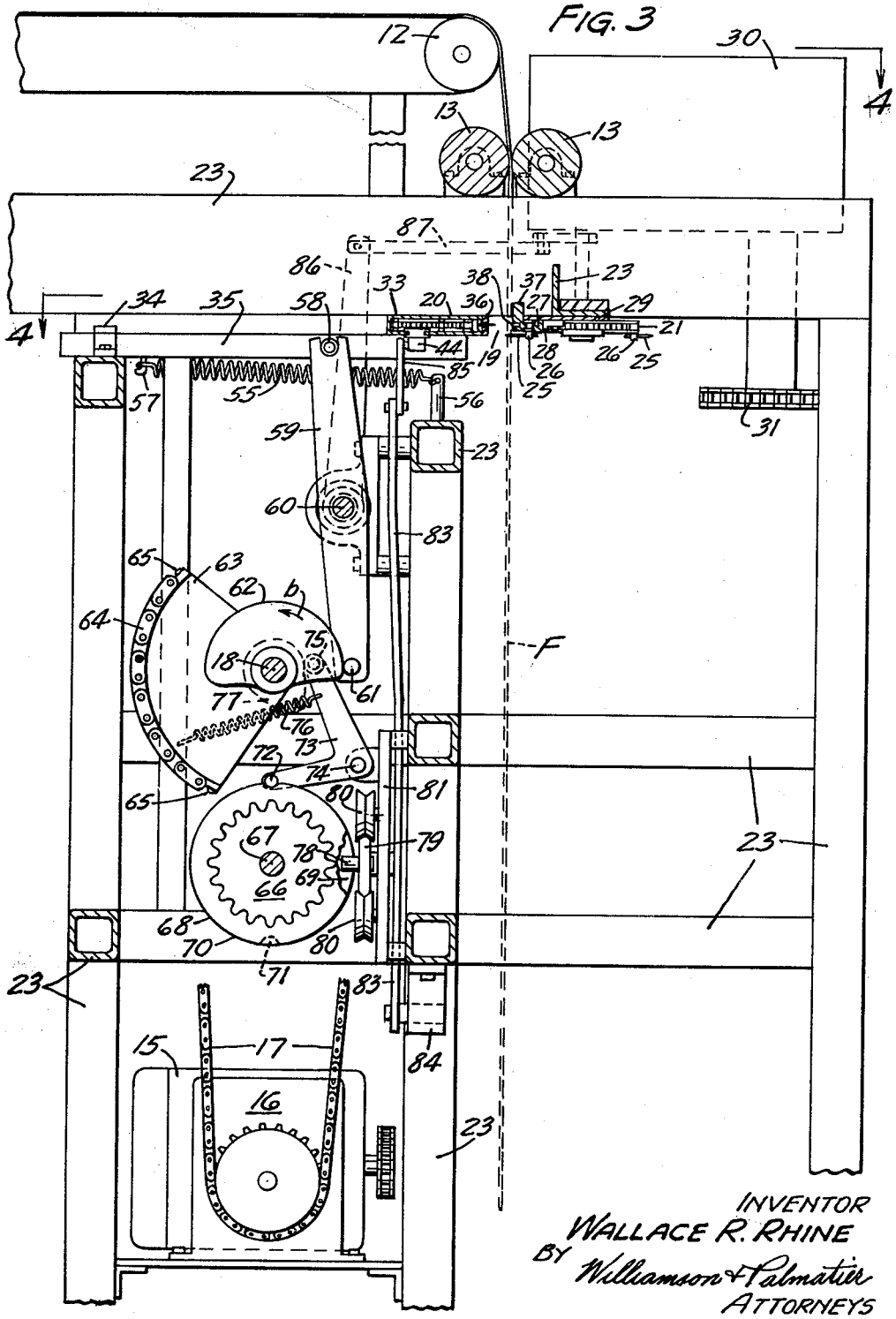

June 29, 1965  W. R. RHINE  3,192,096
CONVEYING AND SEALING APPARATUS
Filed July 16, 1962  4 Sheets-Sheet 4

INVENTOR
WALLACE R. RHINE
BY Williamson & Palmatier
ATTORNEYS

United States Patent Office 3,192,096
Patented June 29, 1965

3,192,096
CONVEYING AND SEALING APPARATUS
Wallace R. Rhine, New Richmond, Wis., assignor to Doughboy Industries, Inc., New Richmond, Wis., a corporation of Wisconsin
Filed July 16, 1962, Ser. No. 209,937
10 Claims. (Cl. 156—583)

This invention relates to apparatus for receiving, conveying and discharging bags constructed of film-type material such as polyethylene or other plastic material, cellophane of all types, film-coated papers, cotton backed laminates and similar materials wherein it is desired to effect manufacturing and/or filling operations with respect to the bag.

In view of the widespread use of bags constructed of a film-type material, it is necessary to handle such bags during the manufacturing and filling thereof in such a manner that the positioning and conveying of the bag may be effected through the use of high speed machinery. However, there is also a clear need for handling the bag without permanently damaging or deforming the bag. Of course it is desired that when the bag is completed and filled, it will present a neat and clean appearance so that the bag will not adversely affect the sale of the product contained therein, but should, on the other hand, improve the salability of the product by properly presenting the product to the purchasing public.

An object of the invention is the provision of a new and improved film-type bag-handling and conveying mechanism of simple and inexpensive construction and operation.

Another object of the invention is the provision of novel apparatus for readily and easily receiving, positively conveying and discharging a bag constructed of such film-type material without producing any important permanent damage to the material of the bag.

Still another object of the invention is the provision of an improved novel bag-conveying media which will engage and hold the bag adjacent the end thereof to be sealed in such a manner as to accommodate and withstand a substantial force in a direction endwise of the bag so as to be thereby adapted for handling large bags of substantial weight and so as to be also adapted for retaining the top of a bag against pressure or forces applied through the bag sidewall and against the product for compacting the product or for snugly fitting the product into the bag with a minimum wastage of space.

A further object of the invention is the provision of a new and novel machine for readily and easily receiving and holding flat film stock for severing the stock into predetermined lengths for the formation of bags and the like.

These and other objects and advantages of the invention will more fully appear from the following description made in connection with the accompanying drawings wherein like reference characters refer to similar parts throughout the several views and in which:

FIG. 2 is a rear elevation view of a machine embodying the present invention;

FIG. 3 is an enlarged detail section view taken approximately at 3—3 in FIG. 2;

Figure 1:
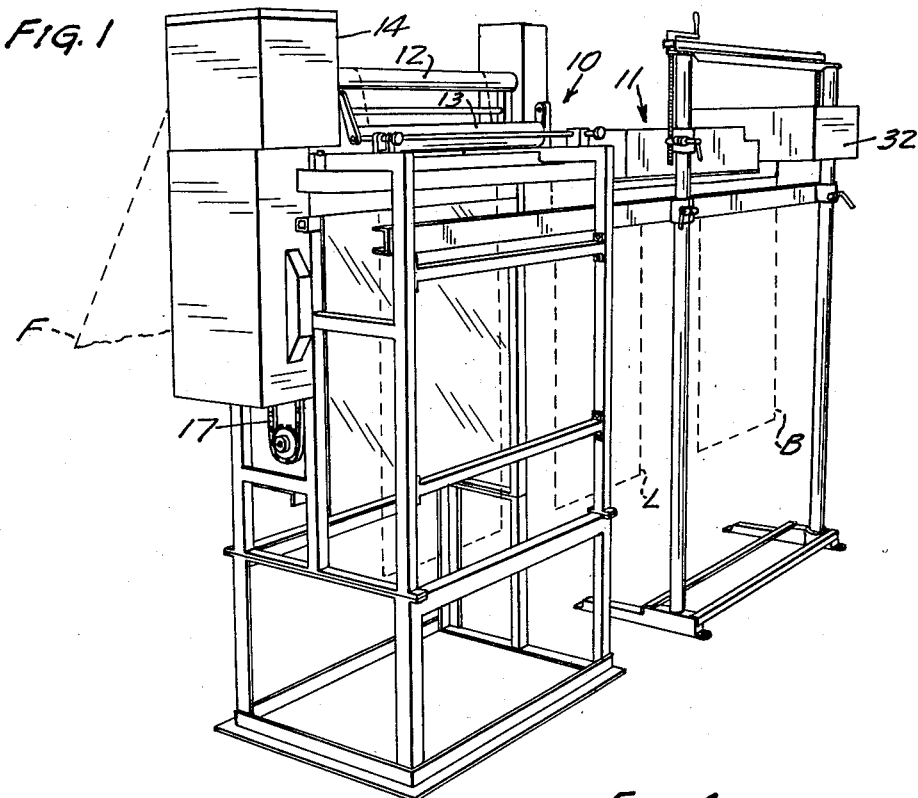
FIG. 1 is a front perspective view of a machine embodying the present invention.
Figure 4:
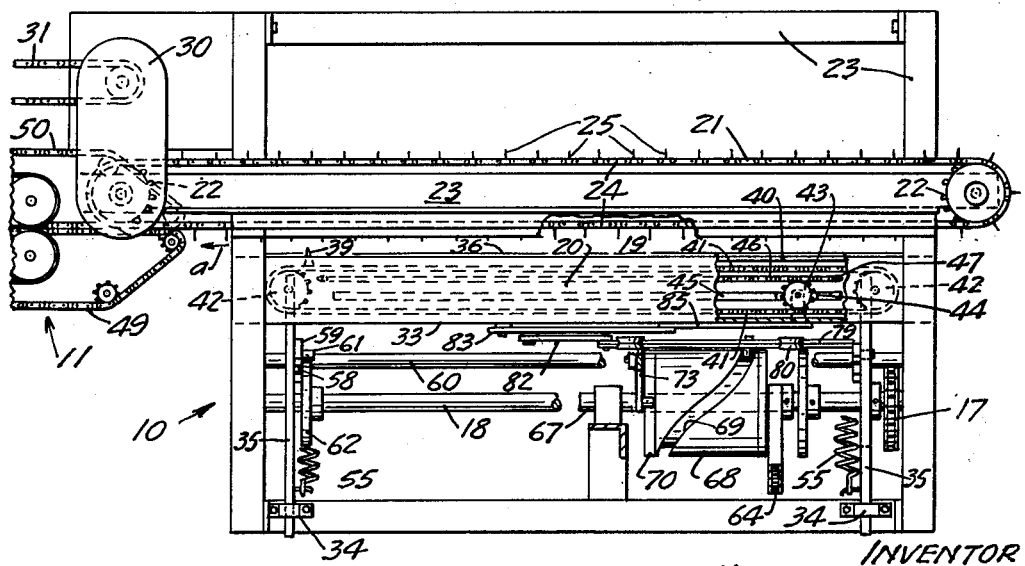
FIG. 4 is a detail section view taken approximately at 4—4 in FIG. 3.
Figure 6:
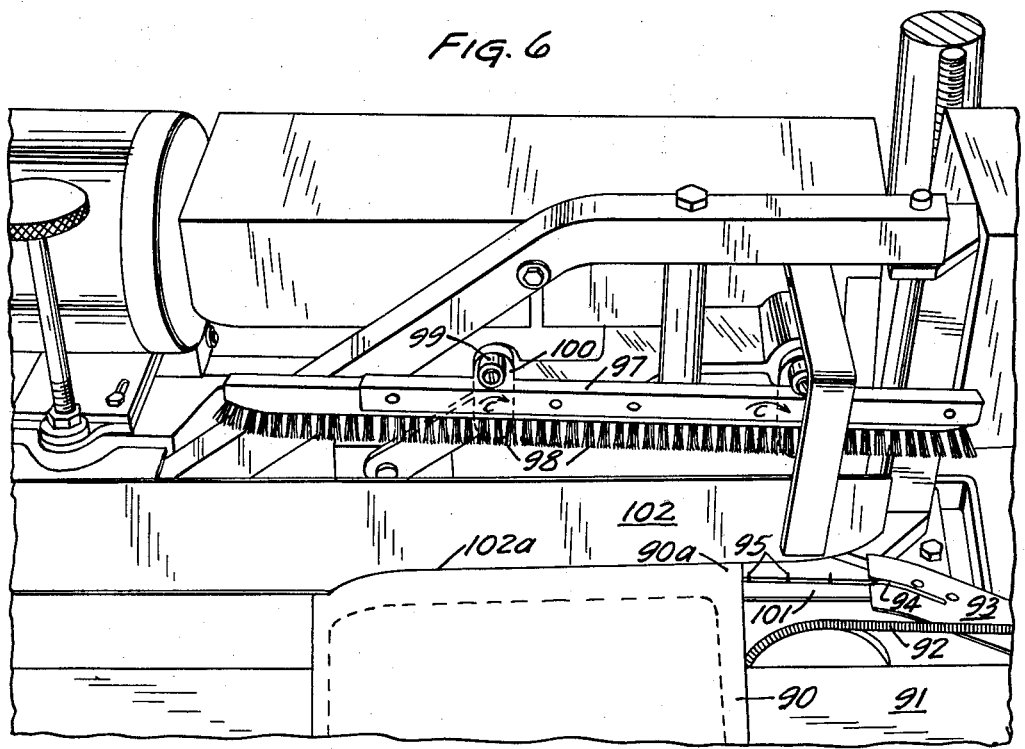
FIG. 6 is a perspective view of portions of a modified form of the invention.
Figure 7:
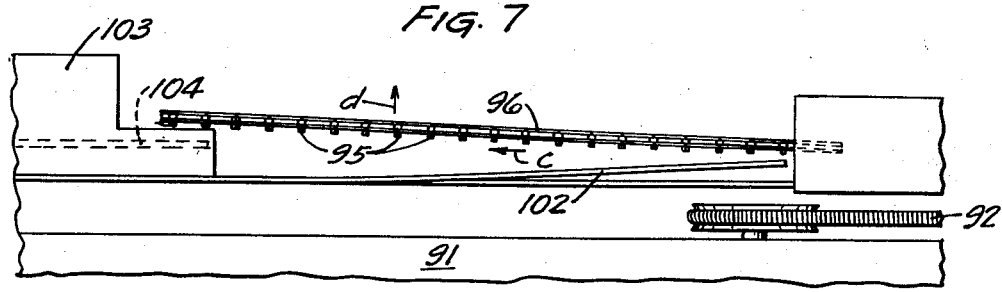
FIG. 7 is a detail plan view of portions of the apparatus shown in FIG. 6.
Figure 5:
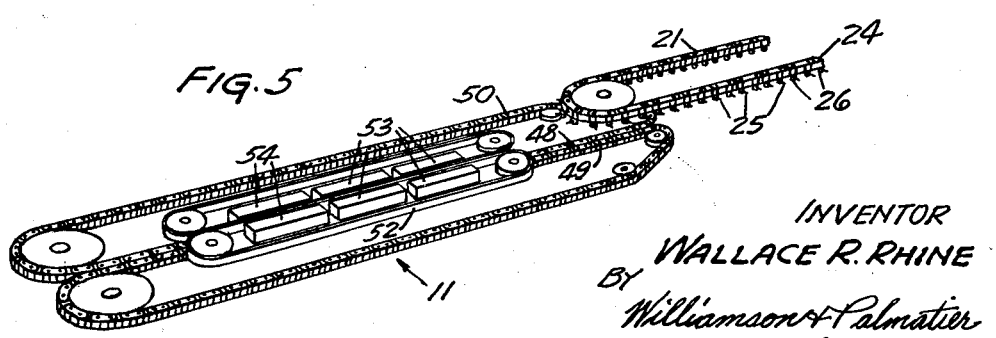
FIG. 5 is a diagrammatic perspective view showing the relationship of certain portions of the apparatus.

The machine shown in FIG. 1 includes apparatus, indicated in general by numeral 10 for receiving a strip of film-type material F which in the form shown, is in tubular form, but flattened so that relatively short lengths L may be cut from the strip of film F and then conveyed by the apparatus 10 to the sealing apparatus 11 whereupon the upper ends of the short lengths L of film material are sealed to produce a bag B.

The film material F is drawn into the apparatus 10 over a number of guide rollers 12 by a pair of cooperating pinch rollers 13 which are intermittently driven and controlled through a gear and control mechanism confined within the housing 14 and powered from a motor 15 which drives through a gear box 16, belt and pulleys 17 for revolving drive shaft 18, the end portion of which applies power into the gear and control mechanism contained within the housing 14. It will be seen that the film material F is fed downwardly from the pinch rollers 13 and through the open space 19 between the slidably mounted pressure-applying and cutoff knife-carrying member or bar 20, and the carrier chain 21.

The carrier chain 21 is trained around a pair of sprockets 22 which are suitably journalled on the supporting structure or frame 23 of the apparatus 10 so as to define a linear run 24 in the chain 21 wherein the carrier chain 21 will move in the direction of arrow a.

The carrier chain 21 has a plurality of substantially rigid needles 25 with tapered and pointed outer ends. The needles 25 are mounted in apertured lugs 26 affixed as by welding to the links of the chain. The needles 25 are carried in the apertures of the lugs and retained therein as by set screws. It will be seen that the needles 25 project transversely of the chain 21 in a direction outwardly of the continuous path of the chain so that as the chain travels along the linear run 24, the needles 25 project slightly into the open space 19.

The chain 21, along the linear run 24 thereof is guided and restrained against movement transversely of the run and inwardly of the continuous path of the chain by an elongate guide strip 27 which is carried by mounting brackets 28 on a frame plate 29 which is affixed to the supporting structure 23 of the apparatus. The chain 21 is driven by a power-transmitting clutch mechanism 30 which is connected to one of the sprockets 22 and which is driven by chain 31 from a motor-actuated drive mechanism contained within the housing 32 which is a part of the sealing apparatus 11 so as to coordinate the speed of chain 21 with the speed of the sealing apparatus hereinafter described. As will be seen hereinafter, the clutch mechanism 30 is periodically operated so as to intermittently operate the carrier chain 21, thereby allowing the chain 21 to periodically remain stationary during application of the film material F thereto.

The film F is pressed against the pointed ends of needles 25 so as to cause impaling of the film by the needles by the pressure-applying and knife-carrying bar or member 20 which in the form shown, comprises a rigid and substantially flat housing 33. The pressure-applying member 20 is slidably mounted on the supporting structure 23 by slide bearings such as that illustrated at numeral 34 which slidably receive rigid bars 35 which are affixed to the rigid housing 33 at its opposite ends so as to adapt the member 20 for movement toward and away from the carrier chain 21. The forward edge of the housing 33 has a resiliently yieldable rubber strip 36 carried thereon and confronting the needles 25 of the carrier chain 21 and also confronting a rigid and elongate anvil strip 37 which is also carried on the mounting plate 29. The anvil strip 37 has a knife-receiving slot 38 all along the length thereof in alignment with the film-severing knife 39 carried by the member 20 and projecting forwardly through the front edge of the housing 33 in slot 40 and through a slit formed in the rubber strip 36. When the pressure-applying member 20 is moved forwardly, the film F is pressed onto the needles 25 by the yieldable strip 36 and the film is also clamped between the rubber strip 36 and the rigid anvil strip 37 so that the film may be cleanly severed by travel of the knife 39 from one end of the member 20 to the other end thereof. When the pressure-applying member is thereafter retracted to the position shown in FIG. 3, the length L of film material is suspended upon the needles 25 of the carrier chain and will be conveyed along the run 24 of the carrier chain in the direction of arrow a, and into the sealing apparatus 11. The gear and control mechanism operating the pinch rollers 13 operates the pinch rollers 13 so that immediately upon retraction of the pressure-applying member 30, additional film material F is supplied downwardly into the open area 19.

The knife 39 is affixed to one of the links of an endless mounting chain 41 confined within the flat housing 33 of the pressure-applying bar. The chain 41 is trained about sprockets 42 and is meshed with a drive sprocket 43 which is rotatably mounted on a slide 44, carried in a slot 45 in the bottom of the housing 33 and slidable therealong. The drive sprocket 43 is also meshed with an immobile length of chain 46 which is affixed as by pins 47 within the housing 33. It will be seen that as the slide 44 is moved along the slot 45, the drive sprocket 43 will roll along the chain 46 and will produce linear movement of the knife-mounting chain 41 at a speed substantially twice that of slide 44 and the knife 39 will travel a distance substantially twice that of the travel of slide 44. The knife 39 is successive severing operations travels first in one direction and then, when a new section of film is presented for severing, will travel in the opposite direction.

It is important to note that the end of linear run 24 of carrier chain 21 is in alignment and overlapped relation with the linear film passage 48 formed between linear runs of chain conveyors 49 and 50 which confront each other in closely spaced and film-gripping relation so as to receive the film from the carrier chain 21 and convey the film to the band-sealing mechanism which includes a pair of endless bands 51 and 52 of heat conducting material such as stainless steel and which are disposed in side-by-side and confronting relation with each other above the passage 48 and chain conveyors 49 and 50 in endwise alignment with the linear run 24 of the carrier chain. Heat-applying bars 53 produce heat and bars 54 produce cooling of the bands and of the film material passing between the bands so as to effect heat-sealing of the films together and to also effect closing of the small apertures in the film produced by the needles 25. It will be understood that the heating bars 53 soften and effectively plasticize the film material passing therebetween. While in the semi-plastic state, the film material flows slightly at the aperture formed by needles 25 and the apertures actually are closed and sealed shut so that when the sealed end of the bag B emerges from the sealing apparatus, the apertures formed by needles 25 have been closed. The sealed films bear no markings whatever showing that the film had been previously impaled. It should be noted that the juxtaposed and linear runs of the heat-applying bands 51 and 52 are in endwise alignment with the run 24 and needles 25 therein of the carrier chain 21. It will be understood that the drive mechanism contained within the housing 32 produces movement of the conveyor chains 49 and 50, bands 51 and 52 and carrier chain 21 at identical speeds.

With regard to the fore-and-aft movement of the pressure-applying member 20 it will be seen that coil springs 55 which are anchored on posts 56 which are affixed to frame structure 23, and are also attached by pins 57 to the bars 35 to continuously bias or urge the pressure-applying member forwardly. The bars 35 are provided with actuating pins 58 which receive the upper bifurcated ends of rocker bars 59 which are affixed to a cross shaft 60. The rocker bars 59 have cam follower rollers 61 on their lower ends which bear against cams 62 on the main drive shaft 18 which is continuously driven by the motor 17 in the direction of arrow b. It will be seen that cam 62 produces rearward movement of the pressure-applying member 20 and retains the member 20 in the rearward position during a portion of cycle of rotation of shaft 18.

Also affixed on shaft 18 is a rigid segment-shaped plate 63 with a short length of chain 64 affixed as by pins 65 on the arcuate periphery thereof for meshing with and driving sprocket 66 through one-half revolution each time the chain 64 is revolved by shaft 18 into engagement with the sprocket 66. The sprocket 66 is affixed to shaft 67, upon which is also affixed a drum-shaped cam member 68 having a cam slot 69 all around the periphery thereof and lying in a plane to the rotation axis of the cam 68 and shaft 67. It will be seen that the drum-shaped cam 68 remains stationary during a substantial portion of each rotational cycle of shaft 18, and is then driven through an arc of 180° and is then stopped again. The shaft 67 is provided with a rocking apparatus including plate 70 having notches 71 in diametrically spaced relation with each other to receive locking pin 72 on crank arm 73 which is swingably mounted on pin 74, which is secured to the frame structure 23. The upper end of crank arm 73 has a cam follower 75 thereon which is continuously urged by coil spring 76, having its opposite ends attached to the arm 73 and the supporting structure respectively, against cam 77 which is affixed to the drive shaft 18 with the lobe thereon appropriately positioned with respect to the position of chain 64 so as to produce a rocking of crank arm 73 and releasing of the pin 72 from the drum-shaped cam 68 to be driven when the chain 64 engages the sprocket 66.

A cam-following pin 78 projects into the slot 69 and is mounted on a slide bar 79 so as to reciprocate the slide bar 79 in a direction longitudinally thereof. The slide bar 79 is mounted on rollers 80 respectively positioned along the upper and lower edges of bar 79 and respectively journalled on mounting plates 81 which are affixed to the supporting structure 23.

A link 82 is attached to one end of the slide bar 79 and is swingably attached to a swingable arm 83, the lower end of which is supported by a bearing 84 on the frame structure, and the upper swinging end of which is swingably connected to an obliquely oriented connecting link 85. The link 85 is connected to the slide 44 for producing linear movement thereof along the pressure-applying member 20 for causing linear movement of the film-severing knife 39.

The shaft 60 has a clutch operating arm 86 thereon which is connected by a link 87 to the clutch mechanism 30 so as to disengage the clutch and cause the carrier chain 21 to stop when the shaft 60 is rocked by forward movement of the pressure-applying member 20 against the chain 21.

In the modified form of the invention, bags 90 of film-type material and filled with a product, possibly a pair of folded bed sheets or a quantity of oranges or some other similar product, are carried upon a belt conveyor 91 with the upper unclosed edge portion 90a of the bag overlapping the edge of the belt 91 and supported by an auxiliary conveyor 92 which in the form shown is constructed of an endless coil spring. The upper open edge portion of the bag will slide up a ramp 93 until the bag covers a slot 94 through which project elongate rigid needles 95 carried on a carrier chain 96 which is mounted in a fashion similar to that previously shown. In this modified form, a pressure-applying member comprising a rigid bar 97 having downwardly extending brush bristles 98 is mounted on bearings 99 attached to rotating arms 100 which revolve so as to move the brush bristles downwardly and obliquely forwardly in the direction of movement of the needles 95 as indicated by arrow c so as to press the film material of the bag onto the needles 95, without requiring that the bag or needles be stopped while the film is being impaled by the needles.

The bag slides between the table-forming plate 101 and an upright plate 102, and the lower edge 102a of the plate 102 gradually converges downwardly toward the table plate 101 so as to restrain any endwise movement of the bulky product contained in the bag 90. It will be seen that the slot 94 and chain 96 diverge from the upright plate 102 so as to progressively pull in the direction of arrow d against the upper edge portion of bag 90 while the product therein is retained by the plate 102, thereby making the bag fit snugly around the product contained therein. A sealing mechanism 103 is positioned adjacent the end of slot 94 and is provided with conveyor chains 104 similar to those previously described for receiving and carrying the bag into the sealing mechanism to be closed.

It will, of course, be understood that various changes may be made in the form, details, arrangement and proportions of the parts without departing from the scope of my invention which consists of the matter shown and described herein and set forth in the appended claims.

What is claimed is:

1. Apparatus for receiving and conveying film-type material,
   comprising a supporting structure,
   a pair of sprockets on the supporting structure,
   an elongate endless chain trained around said sprockets in a continuous path,
   means guiding the chain along one run thereof between the sprockets and preventing transverse movement of the chain in a direction inwardly of the continuous path,
   a plurality of substantially rigid film-impaling and conveying needles each secured to a respective link of the chain and having tapered and pointed outer ends projecting from the chain outwardly of the continuous path,
   an elongate and substantially rigid pressure-applying member extending along and spaced from said run of the chain and having a yieldable film-engaging side portion confronting said run of the chain in spaced relation therewith to permit a sheet of film to be disposed between the member and said run of the chain,
   means mounting and guiding said member for movement entirely toward and away from said run of the chain and causing said yieldable film-engaging portion to engage and receive the outer ends of the needles as pressure is applied on the film, thereby causing the needles to impale and receive the film thereon for conveying along the run.

2. Apparatus for receiving and conveying film-type material,
   comprising a supporting structure,
   an elongate endless and flexible support element extending around a continuous path lying substantially in a plane, one portion of the continuous path extending linearly to define a linear run,
   a plurality of rotary members mounting said elongate endless element and maintaining said element in predetermined orientation with respect to said plane to prevent turning of the element along said run,
   means guiding said elongate flexible element along said run and preventing transverse movement of the elongate element in a direction inwardly of the continuous path, and also preventing turning of the element about an axis extending longitudinally of the run,
   a plurality of substantially rigid film-impaling and conveying needles each secured to said elongate endless element and disposed in spaced relation with each other along said element, said needles having tapered and pointed outer ends projecting from said element in a direction substantially parallel to said plane and in a direction outwardly of the continuous path,
   an elongate and substantially rigid pressure-applying member extending along said run in spaced relation therewith and having a yieldable film-engaging portion confronting said run in spaced relation therewith to permit positioning of the film material between the member and said run of the elongate endless element,
   means mounting and guiding said member for movement entirely transversely of toward and away from the run of said element and causing said yieldable film-engaging portion to engage and receive the outer ends of the needles as pressure is applied on the film and as the needles impale and receive the film thereon for conveying along the run.

3. The invention set forth in claim 1 wherein said pressure-applying member includes a rigid bar with one edge portion thereof confronting the run of the chain, said edge portion having a strip of resiliently compressive material on said edge portion to press against the film and receive the outer ends of the needles as the film is pressed onto the needles.

4. The invention set forth in claim 1, wherein said pressure-applying member includes a rigid bar having one side thereof confronting the run of the chain and wherein said yieldable film-engaging portion comprises a plurality of brush bristles on said side of the bar and projecting therefrom toward and into spaced relation with the run, the ends of the bristles engaging the film when the bar is moved toward said run to press the film onto the needles and to receive the needles between the brush bristles.

5. Apparatus for receiving and conveying film-type material,
   comprising a supporting structure,
   a pair of sprockets on the supporting structure,
   an elongate endless chain trained around said sprockets in a continuous path, a portion of said path defining a linear run,
   means producing intermittent driving of the chain around the continuous path whereby the chain is periodically stationary,
   means guiding the chain along said linear run and preventing transverse movement of the chain in a direction inwardly of the continuous path,
   a plurality of substantially rigid film-impaling and conveying needles each secured to a respective link of the chain and having tapered and pointed outer ends projecting from the chain outwardly of the continuous path,
   an elongate and substantially rigid pressure-applying member extending along and spaced from said run of the chain and having a yieldable film-engaging portion confronting said run in spaced relation therewith to permit insertion of a sheet of film between said member and the run of the chain,
   a slide apparatus mounting and guiding said member for fore-and-aft sliding movement toward and away from the run of said chain,
   and means producing intermittent fore-and-aft sliding movement of said member and causing said film-engaging portion of the member to engage and receive the outer ends of the needles as pressure is applied on the film, thereby causing the needles to impale and receive the film thereon for conveying along the run.

6. Apparatus for receiving and conveying film-type material,
   comprising a supporting structure,
   a pair of sprockets on the supporting structure,
   an elongate endless chain trained around said sprockets in a continuous path, said path having a linear portion defining a linear run for said chain,
   means continuously driving said chain around the continuous path and along said run in a predetermined direction,
   means guiding the chain along one run thereof between the sprockets and preventing transverse movement of the chain in a direction inwardly of the continuous path,
   a plurality of substantially rigid film-impaling and conveying needles each secured to a respective link of the chain and having tapered and pointed outer ends projecting from the chain outwardly from the continuous path,
   an elongate and substantially rigid pressure-applying member extending along and spaced from said run of the chain and having a yieldable film-engaging portion confronting said run of the chain in spaced relation therewith and to permit a sheet of film to be disposed between the member and said run of the chain,
   means mounting, guiding and cyclically moving said member diagonally toward the run of said chain and along said predetermined direction and moving said yieldable film-engaging portion into receiving relation with said needles and thereby press the film against the needles and cause the needles to impale and receive the film thereon for conveying along the run, said last mentioned means also cyclically moving said member away from said run.

7. The invention set forth in claim 6 wherein said pressure-applying member includes a rigid bar with one side thereof spaced from the run of the chain and said yieldable film-engaging portion comprising a plurality of brush bristles on said side of the bar and being yieldable to receive the needles between the bristles, said bristles being flexible to permit flexing of the bristles longitudinally of the run as the film is engaged by the bristles and moved and impressed onto the needles.

8. Apparatus for receiving and conveying film-type material,
   comprising a supporting structure,
   a plurality of sprockets on the supporting structure,
   an elongate endless chain trained around said sprockets in a continuous path, said path having a linear portion defining a linear run of the chain between a pair of said sprockets,
   a plurality of substantially rigid film-impaling and conveying needles each secured to a respective link of the chain and having tapered and pointed outer ends projecting from the chain outwardly of the continuous path and substantially normal to the direction of said run,
   means driving said chain around said continuous path and moving the chain and needles toward one end of said run,
   means producing impaling of the film by the needles and thereby mounting the film on the chain for movement along said run toward said one end thereof,
   a pair of elongate and continuous flexible conveyor elements moving in continuous paths and each having a linear run disposed in closely spaced film-gripping relation with the corresponding run of the other of said conveyor elements and defining a linear film passage between said runs,
   means mounting said conveyor elements with said film passage in aligned and overlapping relation with said one end of the run of said chain,
   means driving said conveyor elements around their respective continuous paths and along their respective linear runs in said predetermined direction to receive the film in the passage at said one end and effect removal of the film from the needles as the chain passes around the sprocket adjacent said one end of the chain run and cause said needles to withdraw from the film.

9. Apparatus for receiving and conveying film-type material,
   comprising a supporting structure,
   a plurality of sprockets on the supporting structure,
   an elongate endless carrier chain trained around said sprockets in a continuous path, said path having a linear portion defining a linear run in the chain,
   a plurality of substantially rigid film-impaling and conveying needles each secured to a respective link of the chain and having tapered and pointed outer ends projecting from the chain and outwardly of the continuous path,
   means producing impaling of the film by the needles of the chain and thereby mounting the film on the chain for movement along said run,
   a pair of elongate and endless chain conveyors in continuous paths and having linear runs disposed in closely spaced and confronting film-gripping relation with each other and defining a film passage therebetween, one of said chain conveyors being disposed in overlapping juxtaposed relation with said one end of the run of said carrier chain, and said passage extending along and in substantial alignment with said one end of the run in said carreir chain,
   means moving said carrier chain and said chain conveyors in predetermined and identical speeds and directions along said runs to thereby cause gripping by the chain conveyors of the film supplied into the passage by the carrier chain and continued linear movement of the film and removal of the film from the needles as the needles are withdrawn and moved with said carrier chain around the sprocket at said one end of the carrier chain run,
   and heat-sealing means in juxtaposed relation with the passage and in endwise alignment with the carrier chain run to produce sealing of the film material conveyed and thermal-plasticizing closure of the needle-produced apertures in the film.

10. Apparatus for severing and conveying film-type material,
    comprising a supporting structure,
    a pair of sprockets on the supporting structure,
    an elongate endless chain trained around said sprockets in a continuous path, said path having a linear portion defining a linear run in the chain,
    means guiding the chain along said run thereof and preventing transverse movement of the chain in a direction inwardly of the continuous path,
    a stationary anvil strip extending along said run of the chain adjacent said guiding means to limit movement of the film,
    a plurality of stationary rigid film-impaling and conveying needles each secured to a respective link of the chain and having tapered and pointed outer ends projecting from the chain outwardly of the continuous path,
    an elongate and substantially rigid pressure-applying member extending along and spaced from said run of the chain and having a yieldable film-engaging portion confronting said run of the chain in spaced relation therewith to permit a sheet of film to be disposed between the member and said run of the chain, means mounting and guiding said member for movement entirely toward and away from said run of the chain and causing said yieldable film-engaging portion to engage and receive the outer ends of the needles as pressure is applied on the film, thereby causing the needles to impale and receive the film thereon for conveying along the run, a film-severing knife projecting toward the anvil from the yieldable film-engaging portion of said member, means on said member mounting said knife for linear movement longitudinally of said member, said knife severing the film in movement of the knife along said member and along the anvil strip.

References Cited by the Examiner
UNITED STATES PATENTS

| | | | |
|---|---|---|---|
| 385,498 | 1/89 | Lund | 198—178 |
| 1,085,538 | 1/14 | Burgess et al. | 198—178 |
| 1,709,788 | 4/29 | Greene | 198—178 |
| 2,597,634 | 5/52 | Grevich | 156—513 XR |
| 2,987,106 | 6/61 | Sylvester | 156—583 XR |

EARL M. BERGERT, *Primary Examiner.*